US010995995B2

(12) United States Patent
Gilbert et al.

(10) Patent No.: US 10,995,995 B2
(45) Date of Patent: May 4, 2021

(54) METHODS AND APPARATUS FOR SIMULTANEOUSLY COOLING AND SEPARATING A MIXTURE OF HOT GAS AND LIQUID

(71) Applicant: VMAC Global Technology Inc., Nanaimo (CA)

(72) Inventors: Tod John Gilbert, Nanaimo (CA); Kyle Robert Barclay McWilliam, Nanaimo (CA)

(73) Assignee: VMAC Global Technology Inc., Nanaimo (CA)

( * ) Notice: Subject to any disclaimer, the term of this patent is extended or adjusted under 35 U.S.C. 154(b) by 620 days.

(21) Appl. No.: 15/317,793

(22) PCT Filed: Apr. 15, 2015

(86) PCT No.: PCT/CA2015/050314
§ 371 (c)(1),
(2) Date: Dec. 9, 2016

(87) PCT Pub. No.: WO2015/188266
PCT Pub. Date: Dec. 17, 2015

(65) Prior Publication Data
US 2017/0115068 A1    Apr. 27, 2017

Related U.S. Application Data

(60) Provisional application No. 62/010,412, filed on Jun. 10, 2014.

(51) Int. Cl.
*F28D 1/053*    (2006.01)
*F28F 1/40*    (2006.01)
(Continued)

(52) U.S. Cl.
CPC ....... *F28D 1/05316* (2013.01); *B01D 53/002* (2013.01); *F28D 7/00* (2013.01);
(Continued)

(58) Field of Classification Search
CPC ............. F28D 1/05316; F28D 1/05325; F28D 1/05333; F28D 1/0535; F28D 1/0536;
(Continued)

(56) References Cited

U.S. PATENT DOCUMENTS

| 1,973,063 A | * | 9/1934 | Grier ....................... F04C 23/00 |
| | | | 418/181 |
| 2,921,448 A | * | 1/1960 | Carraway ............. F22B 37/265 |
| | | | 62/192 |

(Continued)

FOREIGN PATENT DOCUMENTS

| CA | 1142170 | 3/1983 |
| CA | 2363745 | 8/2002 |

(Continued)

OTHER PUBLICATIONS

Atkins, T., & Escudier, M. (2013). specific heat. In A Dictionary of Mechanical Engineering. : Oxford University Press. Retrieved Dec. 5, 2019, from https://www.oxfordreference.com/view/10.1093/acref/9780199587438.001.0001/acref-9780199587438-e-5925. (Year: 2013).*

(Continued)

*Primary Examiner* — Jianying C Atkisson
*Assistant Examiner* — Miguel A Diaz
(74) *Attorney, Agent, or Firm* — Todd A. Rattray; Oyen Wiggs Green & Mutala LLP (57) ABSTRACT

Apparatus and methods for cooling a mixture of hot gas and liquid received from a compressor and simultaneously separating the gas from the liquid, the apparatus comprising a receiving inlet, a header unit, a collector, and a plurality of conduits comprising turbulators which creates turbulence (Continued)

and heat-exchange surfaces to simultaneously separate the liquid from the gas and cooling both the liquid and the gas, and the method comprising receiving the mixture from the compressor through a receiving inlet; directing the mixture into a plurality of conduits; and in each of the plurality of conduits, simultaneously separating the liquid from the gas and cooling both the gas and the liquid.

29 Claims, 6 Drawing Sheets

(51) Int. Cl.
    *F28F 13/12*     (2006.01)
    *B01D 53/00*     (2006.01)
    *F28F 27/00*     (2006.01)
    *F28D 7/00*     (2006.01)

(52) U.S. Cl.
    CPC ............ *F28F 1/40* (2013.01); *F28F 13/12* (2013.01); *F28F 27/00* (2013.01); *B01D 2257/70* (2013.01); *B01D 2258/06* (2013.01)

(58) Field of Classification Search
    CPC ............ F28D 1/05375; F28D 1/05383; F28D 2021/0049; F28D 2021/0089; F28D 9/00; F28F 1/40; F28F 1/42; F28F 1/422; F25B 43/02; F25B 43/006; F25B 31/004; F25B 31/006; F25B 39/00; F25B 39/04; F25B 2339/0442; F25B 2339/0443; F25B 2339/0446; F25B 2400/23; F25B 39/02; F25B 2341/0016; F24F 3/06
    See application file for complete search history.

(56) References Cited

U.S. PATENT DOCUMENTS

| | | |
|---|---|---|
| 3,201,949 A * | 8/1965 | Kocher ............... F25B 43/02 62/192 |
| 3,291,385 A | 12/1966 | Williams et al. |
| 3,654,748 A | 4/1972 | Bloom |
| 3,934,990 A | 1/1976 | Ide, III |
| 4,018,579 A | 4/1977 | Hofmann |
| 4,047,909 A | 9/1977 | Hofmann |
| 4,070,166 A | 1/1978 | Emanuelsson |
| 4,071,336 A | 1/1978 | Pamine |
| 4,093,436 A | 6/1978 | Wenzel |
| 4,145,396 A | 3/1979 | Grantham |
| 4,204,848 A | 5/1980 | Schulmeister et al. |
| 4,233,042 A | 11/1980 | Tao |
| 4,237,696 A | 12/1980 | Coblentz |
| 4,311,439 A | 1/1982 | Stofen |
| 4,405,345 A | 9/1983 | Van Oorschot |
| 4,426,967 A | 1/1984 | McWhorter |
| 4,506,513 A | 3/1985 | Max |
| 4,506,523 A | 3/1985 | DiCarlo et al. |
| 4,508,683 A | 4/1985 | Doll et al. |
| 4,531,955 A | 7/1985 | Cash et al. |
| 4,532,775 A | 8/1985 | Hofmann |
| 4,563,138 A | 1/1986 | Hofmann et al. |
| 4,648,815 A | 3/1987 | Williams |
| 4,657,487 A | 4/1987 | Schonwald et al. |
| 4,668,252 A | 5/1987 | Gerdau |
| 4,670,223 A | 6/1987 | Delachapelle |
| 4,689,969 A | 9/1987 | Van Steenburgh, Jr. |
| 4,715,196 A * | 12/1987 | Sugiura ............... F25B 41/062 62/468 |
| 4,727,907 A | 3/1988 | Duncan |
| 4,756,257 A | 7/1988 | Vind |
| 4,761,166 A | 8/1988 | Kitchener et al. |
| 4,775,484 A | 10/1988 | Schmidt et al. |
| 4,810,264 A | 3/1989 | Dewitz |
| 4,845,334 A | 7/1989 | Stocks et al. |
| 4,848,988 A | 7/1989 | Suzuki |
| 4,899,808 A | 2/1990 | Gregory et al. |
| 4,981,579 A | 1/1991 | Paspek et al. |
| 5,029,448 A | 7/1991 | Carey |
| 5,050,603 A | 9/1991 | Stokes et al. |
| 5,053,126 A | 10/1991 | Krasnoff |
| 5,138,075 A | 8/1992 | Ohgaki et al. |
| 5,158,585 A | 10/1992 | Saho et al. |
| 5,232,596 A | 8/1993 | Castaldi |
| 5,248,436 A | 9/1993 | Kovaletz |
| 5,280,701 A | 1/1994 | Tolman |
| 5,302,300 A | 4/1994 | Porri |
| 5,339,621 A | 8/1994 | Tolman |
| 5,344,627 A | 9/1994 | Fujii et al. |
| 5,350,442 A | 9/1994 | Thelen et al. |
| 5,384,051 A | 1/1995 | McGinness |
| 5,405,533 A | 4/1995 | Hazlebeck et al. |
| 5,431,858 A * | 7/1995 | Harrison, Jr. ........... F28F 25/02 261/111 |
| 5,487,769 A | 1/1996 | Hutchinson et al. |
| 5,492,461 A | 2/1996 | Kitchener et al. |
| 5,558,141 A | 9/1996 | Dannohl |
| 5,558,783 A | 9/1996 | McGuinness |
| 5,601,788 A | 2/1997 | Hyppanen et al. |
| 5,603,222 A * | 2/1997 | Dube ................. F04B 39/06 62/469 |
| 5,655,599 A * | 8/1997 | Kasprzyk ............... F28F 1/40 165/133 |
| 5,746,791 A | 5/1998 | Wang |
| 5,797,980 A | 8/1998 | Fillet |
| 5,814,133 A | 9/1998 | Hunter et al. |
| 5,925,169 A | 7/1999 | Vertriest |
| 5,947,711 A | 9/1999 | Myers et al. |
| 5,948,145 A | 9/1999 | Welch |
| 5,950,732 A | 9/1999 | Agee et al. |
| 6,000,466 A * | 12/1999 | Aoyagi ............... F28F 1/40 165/133 |
| 6,035,628 A | 3/2000 | Dryden |
| 6,109,902 A | 8/2000 | Goris et al. |
| 6,132,495 A | 10/2000 | Welch |
| 6,149,408 A | 11/2000 | Holt |
| 6,245,133 B1 | 6/2001 | Bourgeois |
| 6,251,169 B1 | 6/2001 | Shimomura et al. |
| 6,261,333 B1 | 7/2001 | Dickson |
| 6,402,812 B1 | 6/2002 | Perrotta et al. |
| 6,499,965 B2 | 12/2002 | Cook et al. |
| 6,532,763 B1 | 3/2003 | Gupte |
| 6,536,523 B1 | 3/2003 | Kresnyak et al. |
| 6,569,323 B1 | 5/2003 | Pribytkov |
| 6,709,477 B1 | 3/2004 | Hakansson et al. |
| 6,748,741 B2 | 6/2004 | Martin et al. |
| 6,824,682 B2 | 11/2004 | Branson |
| 6,843,836 B2 | 1/2005 | Kitchener |
| 6,846,348 B2 | 1/2005 | Kitchener |
| 6,858,067 B2 | 2/2005 | Burns et al. |
| 6,955,713 B2 | 10/2005 | Rittner et al. |
| 6,979,362 B2 | 12/2005 | Jackson |
| 6,984,292 B2 | 1/2006 | Kresnyak et al. |
| 6,989,045 B2 | 1/2006 | Bailey et al. |
| 6,991,443 B2 | 1/2006 | Aoki et al. |
| 7,004,999 B2 | 2/2006 | Johnson et al. |
| 7,022,163 B2 | 4/2006 | Olsson et al. |
| 7,063,734 B2 | 6/2006 | Latulipe et al. |
| 7,077,892 B2 | 7/2006 | Lee |
| 7,115,149 B2 | 10/2006 | Stickland et al. |
| 7,128,153 B2 | 10/2006 | Vinegar et al. |
| 7,169,821 B2 | 1/2007 | Branson |
| 7,186,345 B2 | 3/2007 | Lee et al. |
| 7,273,514 B2 | 9/2007 | Bailey et al. |
| 7,275,737 B2 | 10/2007 | Heirman |
| 7,296,399 B2 | 11/2007 | Hoff, Jr. |
| 7,462,211 B2 | 12/2008 | Beech, Jr. et al. |
| 7,465,337 B2 | 12/2008 | Gaertner et al. |
| 7,550,032 B2 | 6/2009 | Brouwers et al. |
| 7,566,356 B2 | 7/2009 | Latulipe et al. |
| 7,569,095 B2 | 8/2009 | Vanderstraeten et al. |
| 7,578,863 B2 | 8/2009 | Becker et al. |
| 7,588,612 B2 | 9/2009 | Marwitz et al. |
| 7,591,985 B2 | 9/2009 | Tezock |

(56) References Cited

U.S. PATENT DOCUMENTS

| | | |
|---|---|---|
| 7,686,859 B2 | 3/2010 | Barratt |
| 7,716,947 B2 | 5/2010 | Brandon et al. |
| 7,727,305 B2 | 6/2010 | Lomax, Jr. et al. |
| 7,753,975 B2 | 7/2010 | Wood et al. |
| 7,754,102 B2 | 7/2010 | Zhang et al. |
| 7,789,942 B2 | 9/2010 | Vanderstraeten et al. |
| 7,811,343 B2 | 10/2010 | Toma |
| 7,815,711 B2 | 10/2010 | Van Hove |
| 7,867,310 B2 | 1/2011 | Baten |
| 7,922,790 B2 | 4/2011 | Vertriest |
| 7,935,164 B2 | 5/2011 | Fang et al. |
| 7,938,874 B2 | 5/2011 | Auber |
| 7,988,756 B2 | 8/2011 | Fujiyama et al. |
| 7,993,425 B2 | 8/2011 | Corattiyil et al. |
| 8,016,901 B2 | 9/2011 | Bloom |
| 8,021,455 B2 | 9/2011 | Adamek et al. |
| 8,048,304 B2 | 11/2011 | Waibel et al. |
| 8,070,846 B2 | 12/2011 | Fujiyama et al. |
| 8,070,863 B2 | 12/2011 | Tsangaris et al. |
| 8,075,668 B2 | 12/2011 | Delmotte et al. |
| 8,083,824 B2 | 12/2011 | Fujiyama et al. |
| 8,118,084 B2 * | 2/2012 | Harvey ................. F28D 1/0417 165/139 |
| 8,128,728 B2 | 3/2012 | Tsangaris et al. |
| 8,147,575 B2 | 4/2012 | Lucas |
| 8,167,982 B2 | 5/2012 | Deubler et al. |
| 8,182,591 B2 | 5/2012 | Deubler et al. |
| 8,187,370 B2 | 5/2012 | Dunn et al. |
| 8,197,698 B2 | 6/2012 | Johnson et al. |
| 8,240,121 B2 | 8/2012 | Hazzard et al. |
| 8,246,789 B2 | 8/2012 | Kanda et al. |
| 8,293,112 B2 | 10/2012 | Nemser et al. |
| 8,313,547 B2 | 11/2012 | Bloom |
| 8,366,883 B2 | 2/2013 | Bednarek et al. |
| 8,444,747 B2 | 5/2013 | Kristensson et al. |
| 8,506,815 B2 | 8/2013 | Nemser et al. |
| 8,512,429 B2 | 8/2013 | Barratt |
| 8,524,082 B2 | 9/2013 | Wiemers et al. |
| 8,597,404 B2 | 12/2013 | Buhrman et al. |
| 8,622,716 B2 | 1/2014 | Tanaka et al. |
| 8,623,119 B2 | 1/2014 | Hanson et al. |
| 2002/0095916 A1 | 7/2002 | Turner et al. |
| 2003/0014951 A1 | 1/2003 | Crouse |
| 2004/0065110 A1 | 4/2004 | Barratt et al. |
| 2004/0089153 A1 | 5/2004 | Burns et al. |
| 2005/0145377 A1 * | 7/2005 | Thors ................. B21C 37/20 165/133 |
| 2005/0211093 A1 | 9/2005 | Latulipe et al. |
| 2005/0217221 A1 | 10/2005 | Stickland et al. |
| 2005/0229553 A1 | 10/2005 | Tegrotenuis et al. |
| 2006/0248865 A1 | 11/2006 | Latulipe et al. |
| 2007/0028571 A1 | 2/2007 | Barratt |
| 2007/0245698 A1 | 10/2007 | Lomax, Jr. et al. |
| 2007/0245752 A1 * | 10/2007 | Honda ................. F24F 3/06 62/115 |
| 2008/0210089 A1 | 9/2008 | Tsangaris et al. |
| 2008/0295814 A1 | 12/2008 | Breuninger et al. |
| 2009/0044702 A1 | 2/2009 | Adamek et al. |
| 2009/0090113 A1 * | 4/2009 | Caillat ................. F04B 53/08 62/56 |
| 2009/0133961 A1 | 5/2009 | Corattiyil et al. |
| 2009/0173102 A1 * | 7/2009 | Ogasawara ............. F25B 39/04 62/498 |
| 2010/0089071 A1 | 4/2010 | Hofmann |
| 2010/0146915 A1 | 6/2010 | Barratt |
| 2010/0275781 A1 | 11/2010 | Tsangaris et al. |
| 2011/0056379 A1 * | 3/2011 | Lucas ................. B01D 45/12 96/216 |
| 2011/0203460 A1 | 8/2011 | Skofteland et al. |
| 2011/0296985 A1 | 12/2011 | Buhrman et al. |
| 2011/0296988 A1 | 12/2011 | Buhrman et al. |
| 2011/0303398 A1 * | 12/2011 | Scott ................. F01M 5/002 165/135 |
| 2012/0067205 A1 | 3/2012 | Pendzich et al. |
| 2012/0079852 A1 | 4/2012 | Northrop et al. |
| 2012/0318215 A1 | 12/2012 | Copley et al. |
| 2013/0014537 A1 * | 1/2013 | Fujisawa ................. F04C 18/16 62/468 |
| 2013/0061628 A1 * | 3/2013 | Moon ................. F25B 31/004 62/468 |
| 2013/0180496 A1 * | 7/2013 | Murphy ................. F28D 9/005 123/196 A |
| 2013/0213223 A1 | 8/2013 | Posa |
| 2013/0213627 A1 * | 8/2013 | Liu ................. F25B 39/00 165/178 |
| 2013/0291499 A1 | 11/2013 | Gardner |
| 2015/0153082 A1 * | 6/2015 | Lundberg ................. F25B 43/02 62/85 |
| 2017/0108290 A1 * | 4/2017 | Ojala ................. F28F 1/40 |
| 2017/0167764 A1 * | 6/2017 | Durrani ................. F25B 31/004 |
| 2018/0164006 A1 * | 6/2018 | Numasawa ............. F25B 43/006 |
| 2018/0194197 A1 * | 7/2018 | Kozasa ................. B60H 1/22 |
| 2018/0250747 A1 * | 9/2018 | Davidson ............. B22F 3/1055 |

FOREIGN PATENT DOCUMENTS

| | | | |
|---|---|---|---|
| CA | 2506544 | 5/2004 | |
| CA | 2512318 | 1/2007 | |
| CN | 2889464 | 4/2007 | |
| CN | 203540223 | 4/2014 | |
| FR | 1006889 A * | 4/1952 | ............. F25B 43/02 |
| FR | 2760977 | 9/1998 | |
| WO | 1999043958 | 9/1999 | |
| WO | 2002084124 | 10/2002 | |
| WO | 2013131522 | 9/2013 | |
| WO | 2014009762 | 1/2014 | |

OTHER PUBLICATIONS

Ohio University. (Jul. 26, 2008). Engineering Thermodynamics. Retrieved Decembers, 2019, from https://www.ohio.edu/mechanical/thermo/property_tables/air/air_Cp_Cv.html. (Year: 2008).*

Engineering Tool Box, (2003). Specific Heat of some Liquids and Fluids, [online] Available at: https://www.engineeringtoolbox.com/specific-heat-fluids-d_151.html [Accessed Dec. 5, 2019]. (Year: 2003).*

* cited by examiner

FIGURE 1

PRIOR ART

METHODS AND APPARATUS FOR SIMULTANEOUSLY COOLING AND SEPARATING A MIXTURE OF HOT GAS AND LIQUID

RELATED APPLICATIONS

This application claims the benefit of the priority of U.S. application Ser. No. 62/010,412 filed 10 Jun. 2014 and entitled METHODS AND APPARATUS FOR SIMULTANEOUSLY COOLING AND SEPARATING A MIXTURE OF HOT GAS AND LIQUID, which is hereby incorporated herein by reference.

TECHNICAL FIELD

The technology disclosed herein relates to the simultaneous cooling and separation of a mixture of hot gas and liquid. Particular embodiments provide methods and apparatus for cooling and separating a mixture of hot gas (e.g. air) and lubricating liquid (e.g. oil) originating from a gas compressor.

BACKGROUND

Gas compressors typically comprise a kinetic energy source, such as an electrical motor, diesel engine, gasoline engine, and/or the like and a suitable mechanism which uses the kinetic energy to compress and pressurize gas. There are a variety of types of known compressors having different types of mechanisms for using the kinetic energy of the energy source to compress and pressurize gas. One class of gas compressors is a liquid-injected gas compressor.

Liquid-injected gas compressors involve the injection of liquids, such as lubrication oil, into the mechanism used to compress and pressurize the gas. Like gas compressors generally, liquid-injected gas compressors may have a variety of mechanisms for compressing and pressurizing the gas. As the gas is compressed in a liquid-injected gas compressor, the gas and the injected liquid heat up, forming a mixture of hot gas and liquid. In some applications, there is a desire to cool the heated mixture. In some applications, there is a desire to separate the mixture (i.e. to separate the gas from the liquid). For example, where the liquid-injected gas compressor is an air compressor, there can be a desire to separate the compressed air from the lubricating oil prior to using the compressed air, to cool the lubricating oil prior to re-using the lubricating oil in the compression and/or to cool the compressed air prior to using the compressed air.

Figure 1:
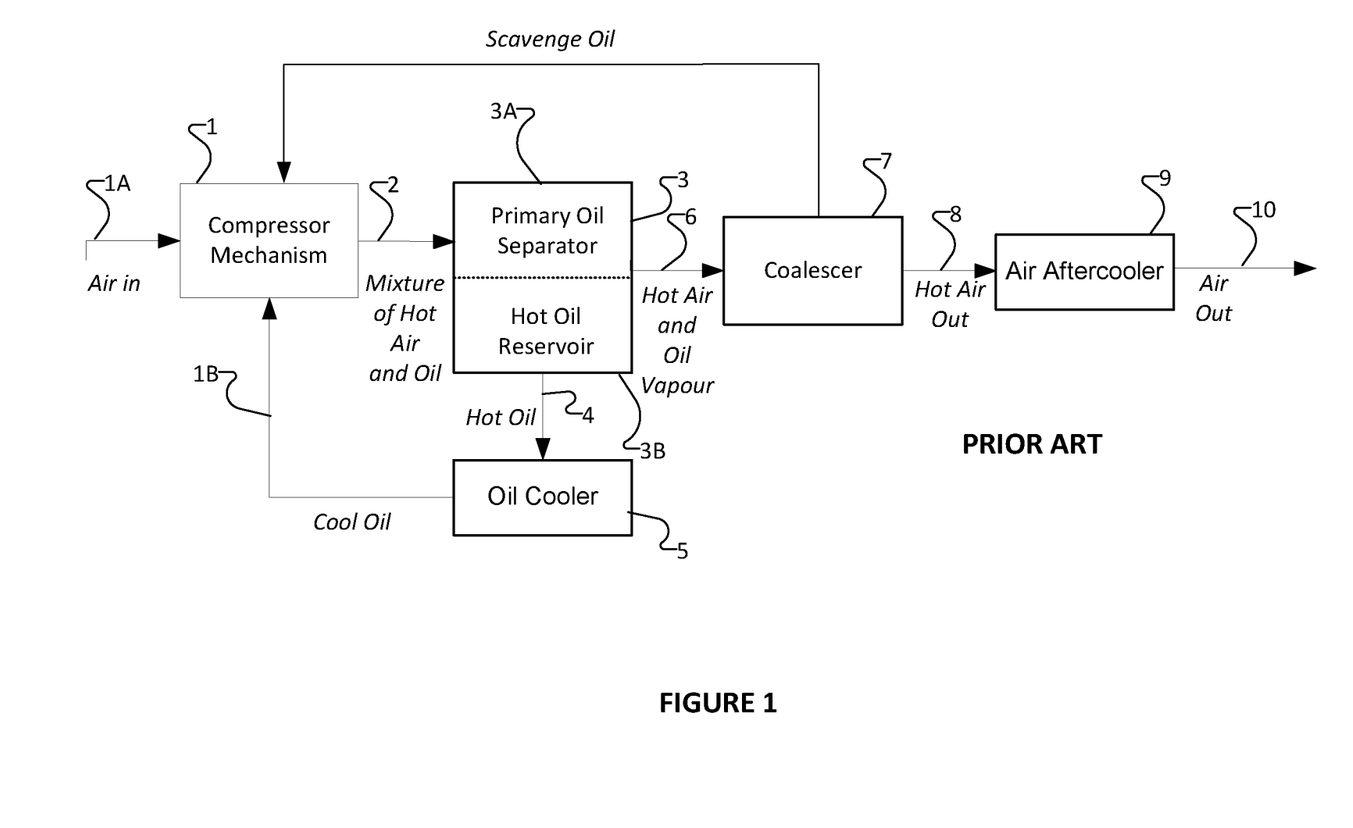
FIG. 1 is a schematic view of a prior art system for separating liquid from a mixture of hot air and liquid and for cooling the separated liquid and air.

FIG. 1 is a schematic diagram illustrating a prior art technique for separating lubricating oil from a mixture of heated air and lubricating oil received from an air compressor and for cooling the separated air and oil. Air 1A is directed into the compressor mechanism 1 and is compressed. As discussed, lubrication oil 1B is also introduced into compressor mechanism 1, such that a mixture of hot air and oil is produced during compression. From the output of compression chamber 1, the mixture 2 of hot air and oil is directed to primary oil separator 3, which includes an oil separator 3A and an oil reservoir 3B. Primary oil separator 3 separates hot oil 4 from hot air-oil mixture 2, and hot oil 4 is collected by oil reservoir 3B. From reservoir 3B, hot oil 4 is transferred to oil cooler 5, where oil 4 is cooled prior to being re-used in compressor mechanism 1. Oil separator 3A also outputs hot air 6 (which may include a small amount of residual oil vapor). Hot air 6 is transferred to coalescer 7, where residual oil vapour is removed as hot scavenge oil and optionally returned to compressor mechanism 1. Coalescer 7 outputs hot air 8 that is substantially free of oil vapor and this hot air 8 is directed to air aftercooler 9. Aftercooler 9 cools hot air 8 and outputs cooler compressed air 10. Cool compressed air 10 may be used for a variety of purposes, such as, powering pneumatic tools, for example.

The FIG. 1 system includes discrete components for both a primary oil separator 3 (where oil 4 and air 6 are separated from air-oil mixture 2) and separate oil cooler 5 (where hot oil 4 is cooled). This multi-step, multi-component process may necessitate a number of discrete components and associated interconnection fittings and may suffer from large physical geometries and higher associated costs, complexities and risk of oil leakage.

The desire to address some of these issues has been recognized in the prior art. For example, U.S. Pat. No. 5,487,769 (Hutchinson et al.) describes an integrated lubricant separator and cooling apparatus alleged to overcome these limitations.

There is an on-going desire for improved methods and apparatus for separating and cooling mixtures of hot gas and liquid ejected from a gas compressor.

BRIEF SUMMARY OF THE DISCLOSURE

The following embodiments and aspects thereof are described and illustrated in conjunction with systems, tools, and methods which are meant to be exemplary and illustrate, not limiting in scope. In various embodiments, one or more of the above-described problems have been reduced or eliminated, while some embodiments are directed to other improvements.

One aspect of the invention provides an apparatus for cooling a mixture of hot gas (e.g. air) and liquid (e.g. lubricating oil) received from a liquid-injected gas compressor (e.g. an air compressor) and simultaneously separating the gas from the liquid. The apparatus comprises a receiving inlet in fluid communication with the compressor for receiving the mixture from the compressor, a plurality of conduits, each conduit in fluid communication with the receiving inlet for receiving the mixture from the receiving inlet, and a collector for receiving the separated gas and liquid from the conduits, the collector comprising a gas outlet for the gas and a liquid outlet for the liquid. Each conduit comprises one or more heat-exchange surfaces for simultaneously separating the liquid from the gas and cooling both the liquid and the gas.

In some embodiments, a combined conduit cross-sectional flow area of the conduits is greater than that of the receiving inlet. In some embodiments, the apparatus comprises a header unit in fluid communication with the receiving inlet and with the conduits for directing the mixture from the receiving inlet to the conduits. The header unit may comprise a header cross-sectional flow area greater than that of the receiving inlet. In some embodiments, each conduit has a conduit cross-sectional flow area less than that of the header unit and the combined conduit cross-sectional flow area of the conduits being larger than that of the receiving inlet. In some embodiments, each conduit comprises a plurality of turbulators shaped to cause turbulence in a flow of the mixture of hot gas and liquid flowing through the conduit and to provide the heat-exchange surfaces. The turbulence in the flow of the mixture and the heat-exchange surfaces may simultaneously separate the liquid from the gas and cool both the liquid and the gas. In some embodiments, the conduits comprise outside fins which comprise fin surfaces that extend away from bores of the conduits. In some embodiments, the liquid comprises lubrication oil. In some embodiments, the apparatus comprises a fan operated to force air over the conduits to transfer heat away from the heat-exchange surfaces. In some embodiments, the apparatus comprises a fan controller configured to control a speed of the fan based on the temperature of the liquid in the collector. In some embodiments, the gas outlet in the collector is located vertically above the liquid outlet. In some embodiments, the apparatus comprises a coalescing filter in fluid communication with the gas outlet. In some embodiments, the apparatus comprises a pressure relief valve connected to the gas outlet to prevent over pressure of the gas exiting the gas outlet. In some embodiments, the temperature of the separated gas at the gas outlet is at least 50% less than the temperature of the mixture at the receiving inlet. In some embodiments, the temperature difference is at least 40%. In some embodiments, the temperature difference is at least 30%. In some embodiments, the temperature difference is at least 20%. In some embodiments, the apparatus comprises a connection between the liquid outlet and the compressor and the liquid ejected from the liquid outlet flows to the compressor through the connection.

Another aspect of the invention provides a method of cooling a mixture of hot gas and liquid received from a liquid-injected gas compressor and simultaneously separating the gas from the liquid. The method comprises receiving the mixture of hot gas and liquid from the compressor through a receiving inlet; directing the mixture into a plurality of conduits, a combined cross-sectional flow area of the plurality of the conduits greater than the receiving inlet, thereby reducing the speed of the mixture; and, in each of the plurality of conduits, simultaneously separating the liquid from the gas and cooling both the gas and the liquid.

In some embodiments, the method of cooling a mixture of hot gas and liquid and simultaneously separating the gas from the liquid comprises receiving the separated gas and liquid from the conduits into a collector and directing the gas out of a gas outlet in the collector and the liquid out of a liquid outlet in the collector. In some embodiments, each conduit comprises a plurality of turbulators shaped to cause turbulence in a flow of the mixture of hot gas and liquid flowing through the conduit and to provide the heat-exchange surfaces. The turbulence in the flow of the mixture and the heat-exchange surfaces may simultaneously separate the liquid from the gas and cool both the liquid and the gas. In some embodiments, the conduits comprise outside fins which comprise fin surfaces that extend away from bores of the conduits. In some embodiments, the method comprises returning the liquid to the compressor. In some embodiments, the method comprises removing any residual liquid remaining in the gas using a coalescing filter connected to the gas outlet. In some embodiments, the method comprises transferring heat from the conduits to air forced over the conduits by a fan. In some embodiments, the method comprises controlling the speed of the fan by measuring a temperature of the mixture in the receiving inlet. In some embodiments, the temperature of the cooled liquid is at least 50% less than the temperature of the mixture at the receiving inlet. In some embodiments, the temperature difference is at least 40%. In some embodiments, the temperature difference is at least 30%. In some embodiments, the temperature difference is at least 20%.

In addition to the exemplary aspects and embodiments described above, further aspects and embodiments will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. The following description of examples of the technology is not intended to be exhaustive or to limit the system to the precise forms of any example embodiment. Accordingly, the description and drawings are to be regarded in an illustrative, rather than a restrictive, sense.

Figure 2:
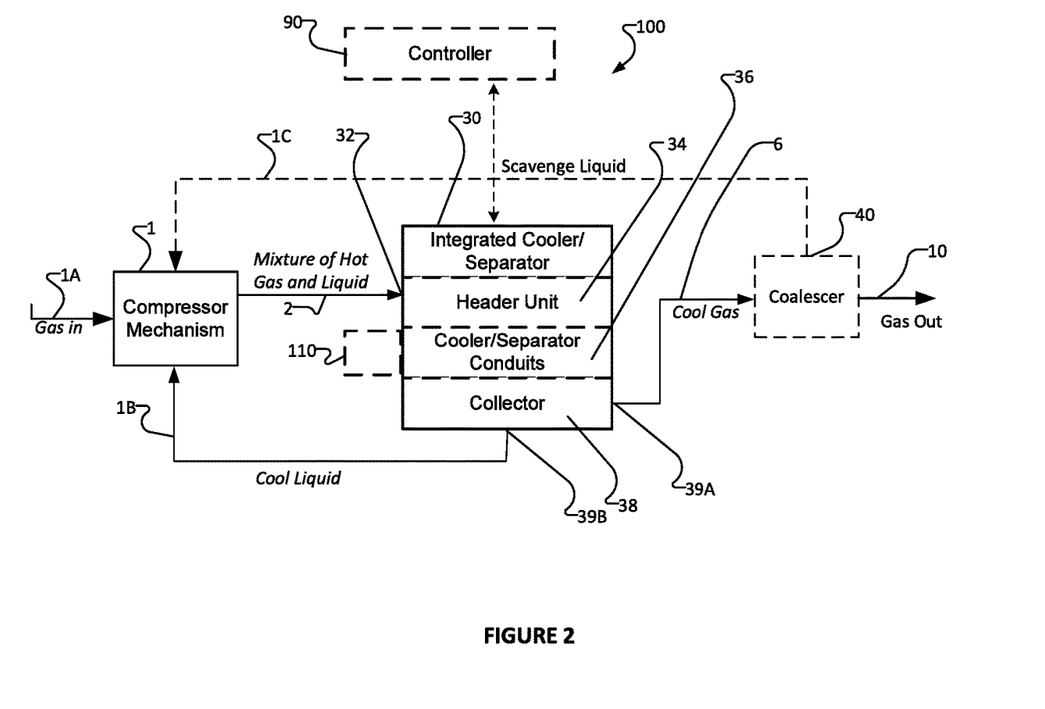
FIG. 2 is a schematic view illustrating an apparatus for simultaneously cooling and separating a mixture of hot gas and liquid according to an example embodiment.

FIG. 2 is a schematic illustration of an apparatus 100 and corresponding method for simultaneously cooling and separating a mixture of hot gas and liquid in an integrated cooler/separator 30 according to an example embodiment. In the illustrated embodiment, apparatus 100 is part of a liquid-injected gas (e.g. air) compressor having a compressor mechanism 1 into which fluid (e.g. oil) is injected. In some embodiments, apparatus 100 may be provided as a retrofit or add-on system which may be operatively coupled to a liquid-injected gas compressor. Gas 1A and liquid 1B are provided to compressor mechanism 1 which compresses the gas. Compressor mechanism 1 may comprise any of a variety of liquid-injected compressor mechanisms known in the art. By way of non-limiting example, in some embodiments, compressor mechanism 1 comprises a rotary-screw type liquid-injected compressor mechanism. The liquid injected into compressor mechanism 1 may perform a number of functions, including lubrication, cooling, formation of seals and/or the like.

Compressor mechanism 1 generates a mixture 2 of hot gas and liquid which is directed into integrated cooler/separator 30 via receiving inlet 32. As explained in more detail below, integrated cooler/separator 30 simultaneously cools the mixture 2 and separates the liquid from the gas. In the illustrated embodiment, cooler/separator 30 comprises a header unit 34 which receives hot mixture 2 from receiving inlet 32, a plurality of cooler/separator conduits 36 wherein mixture 2 is simultaneously cooled and separated and a collector 38 which receives the separated gas and liquid from conduits 36. In some embodiments, the cooled liquid coalesces on surfaces of conduits 36 and drips or is otherwise received in collector 38. In the illustrated embodiment, embodiment collector 38 is integral to cooler/separator 30, but this is not necessary. In some embodiments, collector 38 may be operatively connected to (e.g. in fluid communication with) cooler/separator 30 by pipes, hoses, conduits and/or or the like.

Collector 38 comprises a gas outlet 39A where cooled and separated gas 6 is ejected from collector 38 and a liquid outlet 39B where cooled and separated liquid 1B is ejected from collector 38. Cooled liquid 1B may be re-used in compressor mechanism 1. Cooled gas 6 that is ejected from collector 38 via gas outlet 39A may comprise some residual liquid vapor. In the illustrated embodiment, apparatus 100 comprises an optional coalescer 40 which may remove residual liquid vapor from cooled gas 6 before outputting output gas 10. The cooled and separated output gas 10 may be used for any suitable application, such as powering pneumatic tools, for example. Liquid extracted by coalescer 40 may be returned to compressor mechanism 1 and/or to collector 38.

FIGS. 3A, 3B, 3C and 3D (collectively, FIG. 3) depict various views of an apparatus 100 for simultaneously cooling and separating a mixture of hot gas and liquid according to an example embodiment. In this embodiment, cooling and separating apparatus 100 comprises an integrated cooler/separator 30 which comprises the same features described above and shown in the schematic illustration of FIG. 2. More particularly, cooler/separator 30 comprises receiving inlet 32, header unit 34, separator/cooler conduits 36, collector 38, gas outlet 39A and liquid outlet 39B.

In the FIG. 3 embodiment, apparatus 100 also comprises optional coalescer 40, a mounting block 50 for connecting optional coalescer 40 to collector 38 and an optional liquid filter 60, which is mounted to collector 38 for filtering the separated and cooled liquid before it is re-used in compressor mechanism 1 (not shown in FIG. 3). This arrangement is not necessary. In some embodiments, coalescer 40 and/or liquid filter 60 are not required. In some embodiments, coalescer 40 and/or liquid filter 60 may be operatively connected to cooler/separator 30 without being mounted thereto collector 38—e.g. using pipes, vents, hoses, conduit, combination thereof and/or the like. In the FIG. 3 embodiment, cooling and separating apparatus 100 also comprises mounting brackets 70, which may be used, for example, to connect apparatus 100 to a gas compressor or a piece of equipment (not shown in FIG. 3).

Figure 3A:
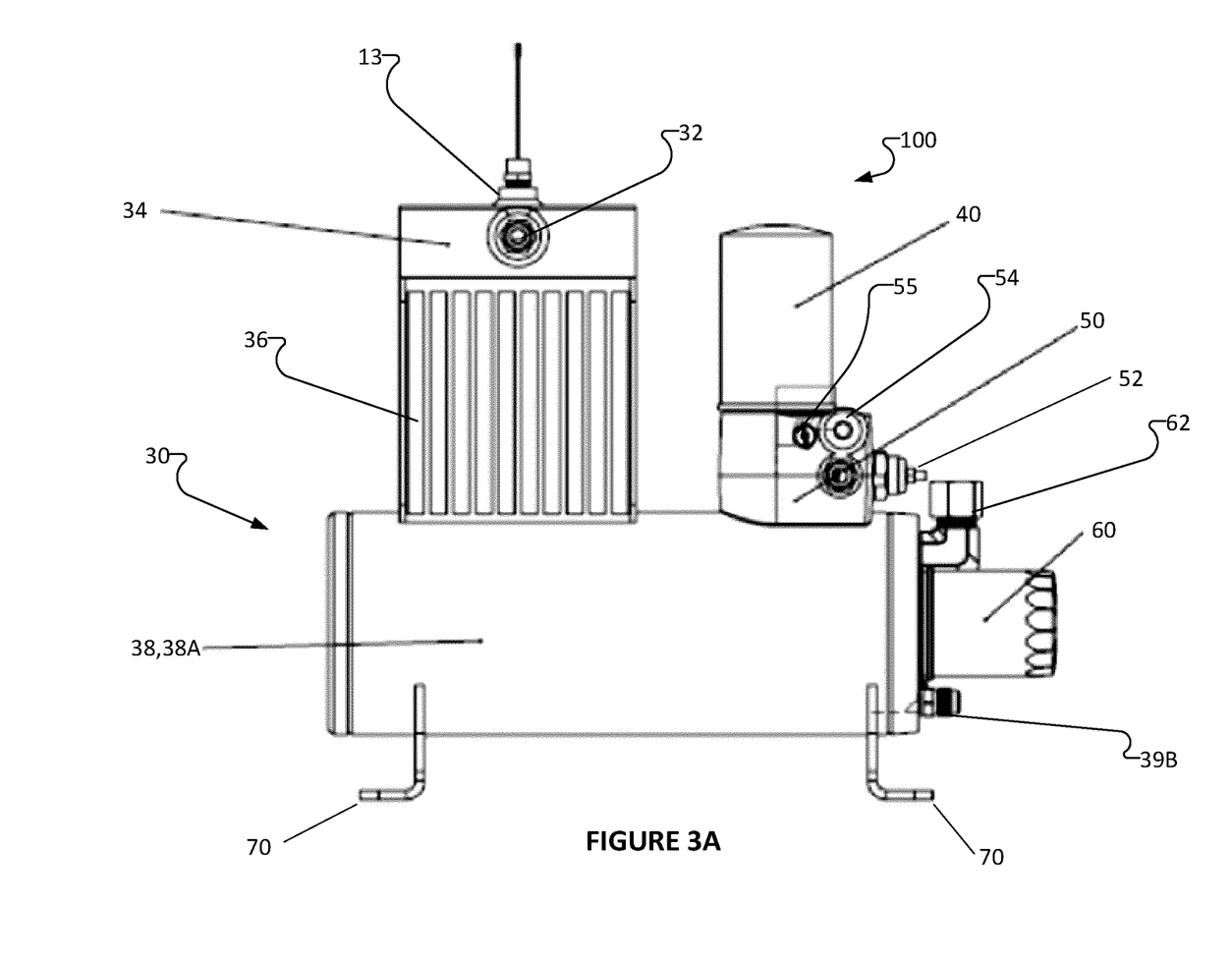
FIG. 3A is a side view illustrating an apparatus for simultaneously cooling and separating a mixture of hot gas and liquid according to an example embodiment.
Figure 3B:
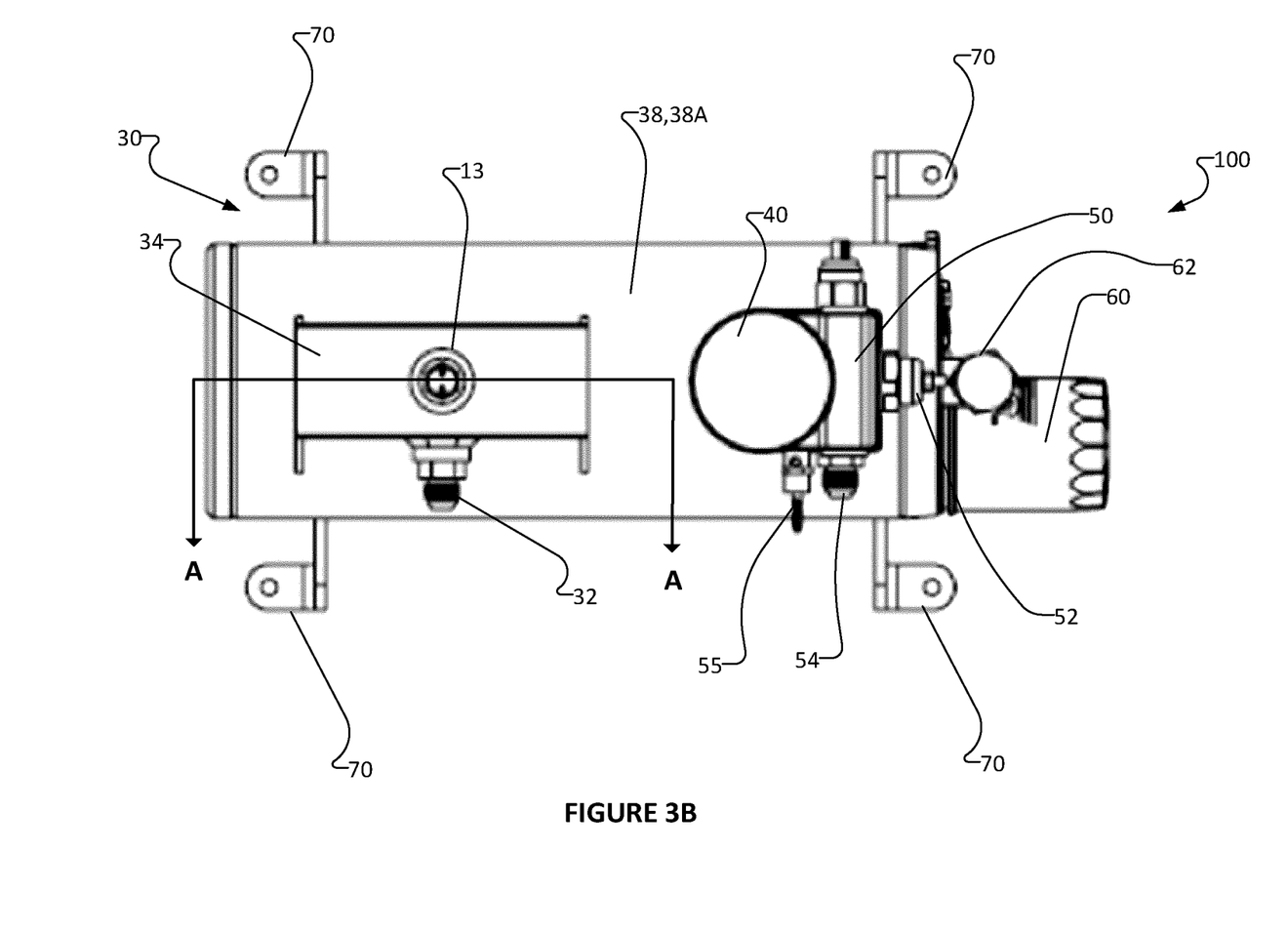
FIG. 3B is a top view illustrating the apparatus of FIG. 3A.
Figure 3C:
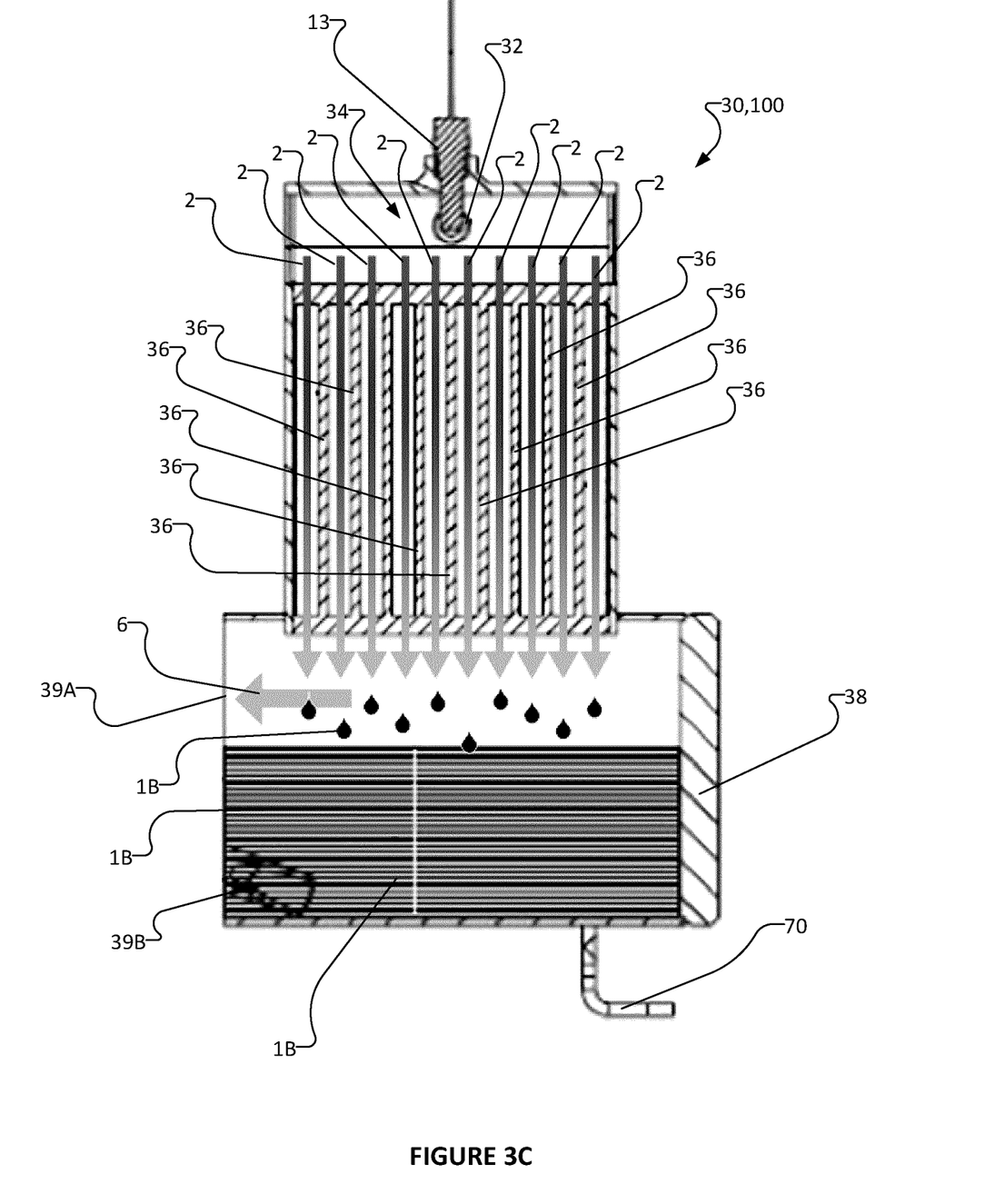
FIG. 3C is a cross-sectional view illustrating the apparatus of FIG. 3A along line A-A.

As best shown in FIG. 3C, integrated cooler/separator 30 comprises a receiving inlet 32, header unit 34, and a plurality of cooler/separator conduits 36. Receiving inlet 32 is in fluid communication with compressor mechanism 1 and is configured to receive mixture 2 of hot gas and liquid from compressor mechanism 1. Header unit 34 is in fluid communication with receiving inlet 32 and the plurality of conduits 36. The mixture 2 of hot gas and liquid flows from receiving inlet 32 into header unit 34; the mixture then flows from header unit 34 to the plurality of conduits 36. In some embodiments, the cross-sectional flow area of header unit 34 is greater than that of receiving inlet 32. Accordingly, the speed of mixture 2 is reduced as mixture 2 flows from receiving inlet 32 into greater cross-sectional flow area of header unit 34. Mixture 2 then flows from header unit 34 into the plurality of conduits 36 within integrated cooler/separator 30. In some embodiments, header unit 34 may be located vertically above conduits 36. This is not necessary, however, and in some embodiments, header unit 34 is located in other orientations (e.g. horizontally) relative to conduits 36. In some embodiments, header unit 34 is omitted and mixture 2 flows directly into the plurality of conduits 36 (e.g. through multiple receiving inlets similar to receiving inlets 32). In some embodiments, the combined cross-sectional flow area of the plurality of conduits 36 is greater than that of the receiving inlet 32.

In the FIG. 3 embodiment, each conduit 36 comprises a conduit cross-sectional flow area that is less than that of the header unit 34, but the combined conduit cross-sectional flow area of the conduits 36 is larger than that of receiving inlet 32. Therefore, as mixture 2 flows through header unit 34 and into conduits 36, the flow speed of mixture 2 is maintained at a low rate (as compared to the speed of mixture 2 when travelling through receiving inlet 32). Conduits 36 may be at least partially vertically oriented, although this is not necessary. In some embodiments, conduits 36 may have other orientations. For example, conduits 36 may be oriented horizontally or at some angle relative to vertical.

Figure 3D:
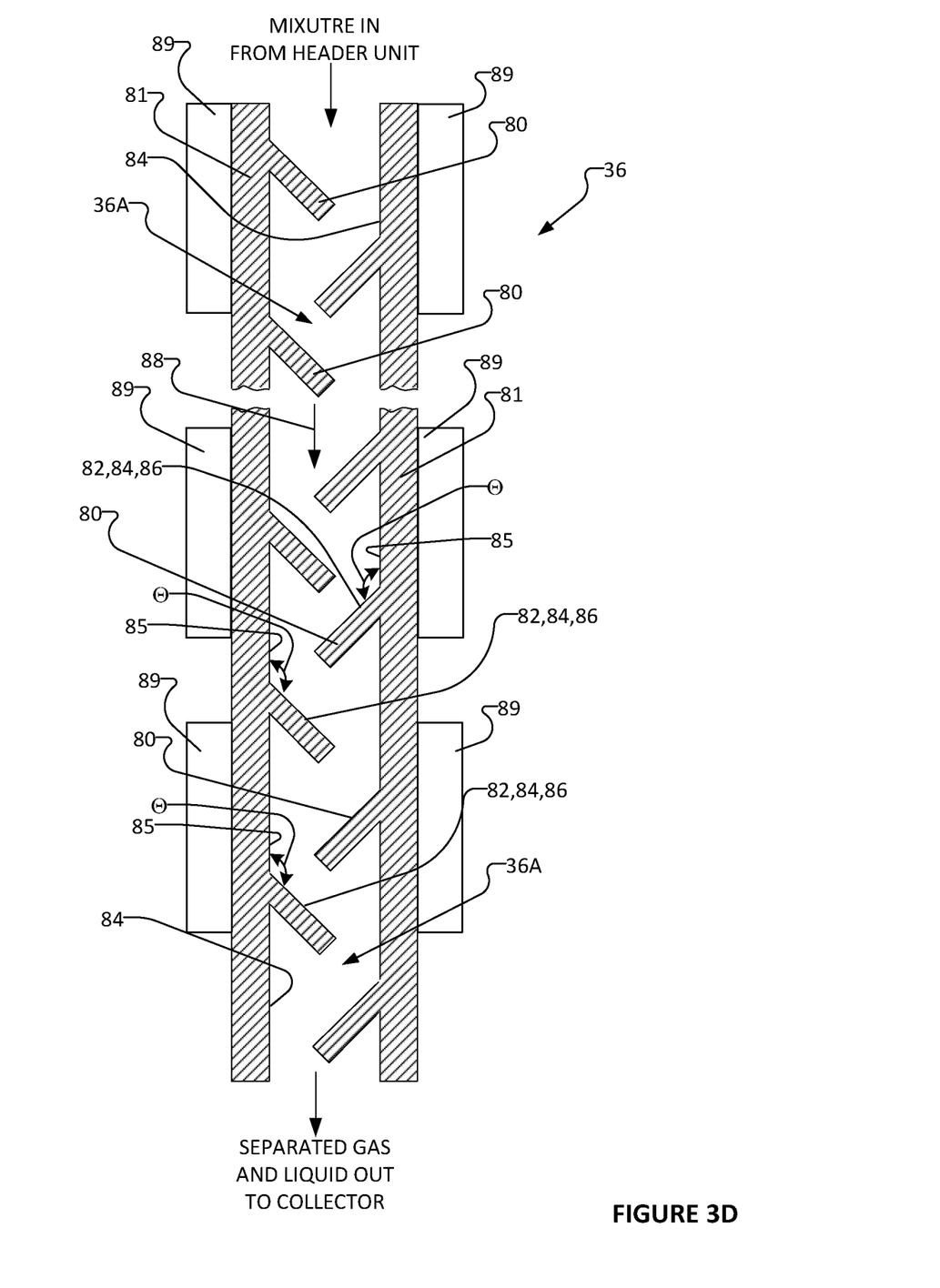
FIG. 3D is a cross-sectional view of a single conduit of the FIG. 3A apparatus according to a particular embodiment.

As shown in FIG. 3D, conduits 36 comprise passages or bores 36A through which mixture 2 flows. Passages 36A of conduits 36 may be defined by heat-exchange surfaces 84. In the illustrated embodiment, each conduit 36 comprises a plurality of turbulators 80 which are shaped to cause turbulence in the flow of mixture 2 through conduits 36 and to provide turbulator heat-exchange surfaces 82. The turbulence in the flow of mixture 2 caused by turbulators 80 and turbulator heat-exchange surfaces 82 simultaneously cool and separate mixture 2 into gas 6 and liquid 1B. More particularly, the turbulence caused by turbulators 80 encourages coalescing of the liquid 1B from mixture 2 onto heat-exchange surfaces 84 (including turbulator heat-exchange surface 82) in bores 36A of conduits 36. Conduits 36 may be fabricated from materials comprising high thermal conductivity, such as suitable metals, steel, other metal alloys and/or the like. Turbulator heat-exchange surfaces 82 allow heat to transfer from mixture 2 (and/or from separated liquid 1B and/or from separated gas 6) onto turbulator heat-exchange surfaces 82, thereby cooling mixture 2, separated liquid 1B and/or separated gas 6. Accordingly, flow of mixture 2 is disrupted, causing separation of liquid 1B and gas 6 from mixture 2, and mixture 2, liquid 1B and/or gas 6 are simultaneously cooled during movement through conduits 36. In some embodiments, turbulators may be omitted from conduits 36, and the internal heat-exchange surfaces 84 of conduits 36 are sufficient for simultaneously cooling and separating mixture 2 into liquid 1B and gas 6.

Turbulators 80 may extend from sidewall(s) 81 of conduits 36 into bores 36A of conduits 36. In the FIG. 3D embodiment, turbulators 80 comprise flow-facing surfaces 86 which at least partially face a direction 88 of flow through conduit 36 (e.g. in the illustrated embodiment, flow facing surface 86 at least partially face header unit 34). Flow-facing surfaces 86 may be oriented such that the angles θ between flow-facing surfaces 86 and the bore-defining surface(s) 85 of sidewall(s) 81 of conduits 36 are greater than 90°. This angular orientation of flow-facing surfaces 86 relative to the bore-defining surface(s) 85 of sidewall(s) 81 may help to promote the flow of separated liquid 1B through conduits 36 and may help to prevent accumulation of separated liquid 1B in conduits 36. In some embodiments, some of flow-facing surfaces 86 may be oriented at different angles θ than others of flow-facing surfaces 86. In some embodiments, flow-facing surfaces 86 may have the same orientation at the same angles θ. In some embodiments, these angles θ may be 90°.

Turbulators 80 may increase the surface area of heat-exchange surfaces 84 in bores 36A of conduits 36 which provide more surface area for liquid 1B to coalesce. The external surfaces of conduits 36 may comprise fins 89 which may help to dissipate heat from conduits 36. In the FIG. 3D embodiments, fins 89 comprise fin surfaces which extend away from bores 36A of conduits 36 to increase the surface area over which heat may be dissipated from conduits 36. In some embodiments, all of conduits 36 comprise fins 89. In some embodiments, only some of conduits 36 comprise fins 89.

In some embodiments, conduits 36 are actively cooled. For example, a heat-exchange fluid may be directed across the external surfaces of conduits 36 (including, for example, across fins 89). As the heat-exchange fluid circulates around conduits 36, heat from the external surfaces of conduits 36 is transferred to the heat-exchange fluid, and more heat can be transferred from mixture 2, separated liquid 1B and/or separated gas 6 to heat-exchange surfaces 84 (including turbulator heat-exchange surfaces 82) of conduits 36. In one embodiment, the heat-exchange fluid is air and cooling and separating apparatus 100 comprises a fan 110 operated to blow the air across conduits 36. In some embodiments, the heat-exchange fluid is liquid and cooling and separating apparatus 100 comprise a pump for circulating the liquid.

In the FIG. 3 embodiment, collector 38 comprises a tank 38A. Collector 38 comprises gas outlet 39A and liquid outlet 39B which respectively provide outlets for cooled gas 6 and cooled liquid 1B. In some embodiments, gas outlet 39A is located vertically above the liquid outlet 39B collector 38, but this is not necessary. In the FIG. 3 embodiment, gas outlet 39A connects collector tank 38A to mounting block 50 to permit the egress of cooled gas 6 from collector tank 38A to optional coalescer 40. This is not necessary. In some embodiments, gas outlet 39A ejects cooled gas 6 from collector 38 to optional coalescer 40 without interposed mounting block 50 (e.g. using hoses, pipes, conduits and/or the like). In some embodiments, optional coalescer 40 is not present and gas outlet 39A ejects cooled gas 6 from collector 38 directly to an external device (not shown), where compressed gas 6 may be used for other applications. By way of non-limiting example, compressed gas 6 may be used for pneumatic tools and/or the like. In the FIG. 3 embodiment, liquid outlet 39B comprises a pipe to permit the egress of cooled liquid 1B from collector tank 38A to compressor mechanism 1.

As is known in the art, optional coalescer 40 may remove any residue cooled liquid (e.g. liquid vapor) from cooled gas 6. In some embodiments, coalescer 40 comprises a coalescing separator. In some embodiments, coalescer 40 comprises a filter that promotes the residual liquid vapour or droplets to coalesce. The amount of residual liquid 1C recovered by coalescer 40 is typically small in comparison to the amount of liquid 1B recovered by cooler/separator 30. In some embodiments, a ratio of the amount of liquid 1B recovered from cooler/separator 30 to the amount of liquid 1C recovered from coalescer 40 is greater than 500:1. Compressed and cooled gas 10 emitted from coalescer 40 may be used by external device (not shown), such as, by way of non-limiting example, pneumatic tools and/or the like.

In the embodiment illustrated in FIG. 3, mounting block 50 comprises a minimum pressure check valve 52, provisions for tank blow down 54, and pressure release valve 55. Minimum pressure check valve 52 may ensure that the pressure of cooled gas 6 exiting from gas outlet 39A of collector 38 (and flowing to coalescer 40 or to an external device) is at a level that would not damage coalescer 40 and/or external device(s) (e.g. pneumatic tools) connected to receiver compressed gas 6, 10 from the compressor. Minimum pressure check valve 52 may also ensure that there is sufficient pressure to promote the return of liquid 1B to compressor mechanism 1. Provisions for tank blow down 54 allow pressure within collector 38 to be released (e.g. for safety reasons) when the compressor is shut down and may also be used to reduce the load on compressor mechanism 1 during start-up. Collector 38 may further comprise a liquid input 62 through which liquid 1B may be added into collector 38 (e.g. when more liquid 1B is desired for operation of compressor mechanism 1). Pressure release valve 55 may also be used to lower the pressure within collector 30, for example, if it exceeds a threshold pressure or when it is otherwise desired to relieve the pressure in collector 30.

In such embodiments, cooling and separating apparatus 100 comprises a temperature sensor 13 which is operatively connected to receiving inlet 32 to measure the temperature of mixture 2 as it flows from compressor mechanism 1 to receiving inlet 32. Temperature sensor 13 may be used to shut off compressor mechanism 1 and/or cooling/separating apparatus 100 due to overheating. Temperature information provided by temperature sensor 13 may also be used to determine whether to turn on/off or increase/decrease active cooling of conduits 36 (e.g. for controlling the on/off status or operational speed of a fan (which blows cooling air) or a pump (which pumps cooling liquid)). In some embodiments, cooling and separating apparatus 100 comprises one or more additional or alternative sensors, such as pressure sensors, flow sensors, additional temperature sensors, and/or the like (not expressly shown). Such sensors may be used to monitor different characteristics of mixture 2 as it moves from receiving inlet 32 to header unit 34 and then into the plurality of conduits 36. Such sensors may additionally or alternatively be used to monitor characteristics of cooled gas 6 and/or cooled liquid 1B.

In some embodiments, cooling and separating apparatus 100 may be provided with an optional controller 90 (FIG. 2). Controller 90 may interact with and control the other functional components of cooling and separating apparatus 100. Controller 90 may comprise any suitable controller, such as, for example, a suitably configured computer, microprocessor, microcontroller, field-programmable gate array (FPGA), other type of programmable logic device, pluralities of the foregoing, combinations of the foregoing, and/or the like. Controller 90 may have access to software which may be stored in computer-readable memory accessible to controller 90 and/or in computer-readable memory that is integral to controller 90. Controller 90 may be configured to read and execute such software instructions and, when executed by controller 90, such software may cause controller 90 to implement some of the functionalities described herein. Controller 90 is not limited to being a digital or electronic controller. In some embodiments, controller 90 could comprise a pneumatic (e.g. air-solenoid) based controller, a mechanical (e.g. cable-pull) based controller and/or the like. In some embodiments, controller 90 may be automatic, but this is not necessary. In some embodiments, controller 90 may be effected in part by a human operator (e.g. via a human-operated user interface and/or the like). Controller 90 may have access to one or more sensors in cooling and separating apparatus 100 for detecting operational characteristics of the different components of cooling and separating apparatus 100. In some embodiments, controller 90 comprises a switch (e.g. a temperature-activated switch) that changes between on and off states depending on the temperature information received from temperature sensor 13 and correspondingly controls the on/off states of a fan (for cooling air) or a pump (for cooling liquid). In some embodiments, controller 90 may also receive information about compressor mechanism 1, such as the number of rotations per minute, the temperature in compressor mechanism 1, the pressure within compressor mechanism 1 and/or the like.

Controller 90 may monitor the temperature of cooled liquid 1B in collector 38 using suitable temperature sensor(s) and may controllably modify the speed at which the heat-exchange fluid is moved across the external surfaces of conduits 36 based on the monitored temperature. In some embodiments, the fan or the pump driving the heat-exchange fluid may be turned on or off, driven faster or slower, pulse-width modulated and/or the like by controller 90 depending on the temperature of cooled liquid 1B in collector 38. For example, controller 90 may increase the flow of the heat-exchange fluid across conduits 36 when the temperature of cooled liquid 1B in collector 38 is above a desired temperature level. The desired temperature level may be pre-programmed or configurable (e.g. user-configurable). Where the heat-exchange fluid is air, controller 90 may control the speed of the fan to correspondingly control the air flow across the external surfaces of conduits 36. If the heat-exchange fluid is liquid, controller 90 may control the speed of the pump to correspondingly control the rate at which the liquid is driven across the external surfaces of conduits 36.

In some embodiments, controller 90 may monitor the pressure of cooled gas 6 at gas outlet 39A in collector 38 and may open or close, or increase or reduce the size of, pulse-width modulate and/or the like the operation of gas outlet 39A based on the pressure measurements. In some embodiments, controller 90 may similarly control the flow of mixture 2 from compressor mechanism 1 into receiving inlet 32 based on information from pressure sensors in the receiving inlet 32, header unit 34, conduits 36, and/or collector 38.

In operation, the FIG. 3 embodiment provides an example embodiment of a method for simultaneously cooling and separating a hot air and gas mixture 2. After gas 1A and liquid 1B are introduced into compressor mechanism 1 to form mixture 2 of hot gas and liquid, mixture 2 is received by receiving inlet 32 of integrated cooler/separator 30. In the FIG. 3 embodiment, mixture 2 is directed to header unit 34 from receiving inlet 32, the cross-sectional flow area of header unit 34 being greater than that of receiving inlet 32. The greater cross-sectional flow area in header unit 34 reduces the speed of mixture 2. The combination of the cross-sectional flow areas of conduits 36 is also greater than that of receiving inlet 32, such that the speed of mixture 2 is slower when mixture 2 enters conduits 36 (relative to its travel through receiving inlet 32). This reduced speed correspondingly increases the residence time of mixture 2 in conduits 36 where simultaneous separation of hot gas 6 and liquid 1B from mixture 2 and cooling of mixture 2, hot gas 6 and/or liquid 1B take place.

In the FIG. 3 embodiment, mixture 2 from header unit 34 is distributed among the plurality of conduits 36 of integrated cooler/separator 30. Conduits 36 may comprise a plurality of turbulators 80 having the features described above, which create turbulence in mixture 2 and provide turbulator heat-exchange surfaces 82 within conduits 36. As mixture 2 comes into contact with the cooler heat-exchange surfaces 84 (including turbulator heat-exchange surfaces 82 of turbulators 80) within conduits 36, heat is transferred from the hot gas and liquid in mixture 2 to heat-exchange surfaces 84. The transfer of heat lowers the temperature of mixture 2, gas 6 and/or liquid 1B and, as a result of saturated vapour pressure, the vapor in mixture 2 will condense into liquid 1B while cooling, thereby causing separation of liquid 1B and gas 6. Cooling of mixture 2 increases the viscosity of the liquid 1B mixed thereby such that liquid 1B coalesces and form large droplets that may collect on heat-exchange surfaces 84 within conduits 36. The turbulence created by the turbulators 80 may also encourage coalescing of liquid 1B from mixture 2 and collection of liquid 1B on heat-exchange surfaces 84 of conduits 36. The wetted heat-exchange surfaces 84 in conduits 36 may in turn increase the heat transfer properties across heat-exchange surfaces 84 leading to improved cooling of mixture 2, gas 6 and/or coalesced liquid 1B on the heat-exchange surfaces 84 of conduits 36.

In some embodiments, the method comprises the actively cooling the external surfaces of conduits 36. In such embodiments, heat is transferred from the external surfaces of conduits 36 (e.g. from fins 89) to a heat-exchange fluid forced over the external surfaces of conduits 36. In some embodiments, the heat-exchange fluid comprises air, and a fan blows the air across the external surfaces of conduits 36. In some embodiments, the heat-exchange fluid comprises liquid that is circulated around the external surfaces of conduits 36. In some embodiments, the method comprises controlling the rate at which the fan blows the heat-exchange air and/or the rate at which the pump drives the heat-exchange liquid based on the temperature of the liquid 1B within collector 38, the temperature of mixture 2 at the receiving inlet 32, temperature of the liquid within different areas of conduits 36, or a combination of these temperature readings. In some embodiments, both air and liquid are used as heat-exchange fluids to remove heat from the external surfaces of conduits 36. In some embodiments, actively cooling conduits 36 is improved by providing fins 89 on the external surfaces of conduits 36.

Liquid 1B from mixture 2 that coalesces on heat-exchange surfaces 84 of conduits 36 may be directed into collector 38. In the FIG. 3 embodiment, the coalesced liquid 1B drips or flows down conduits 36 into collector 38 (e.g. by gravity and/or pressure associated with mixture 2 and/or separated air 6).

The method may further comprise returning cooled liquid 1B from collector 38 to compressor mechanism 1 through liquid outlet 39B in collector 38. In the FIG. 3 embodiment, liquid outlet 39B comprises a return conduit that returns cooled liquid 1B to compressor mechanism 1. In some embodiments, before being returned to compressor mechanism 1, liquid 1B flows through liquid filter 60. In some embodiments, liquid outlet 39B comprises an aperture allowing liquid 1B to drain out of collector 38. In some embodiments, the method comprises returning liquid captured by coalescer 40 (cooled scavenge liquid) to compressor mechanism 1.

In some embodiments, the difference in temperature between separated gas 6 at gas outlet 39A and mixture 2 at receiving inlet 32 is 50%. In some embodiments, the temperature difference is at least 40%. In some embodiments, the temperature difference is at least 30%. In some embodiments, the temperature difference is at least 20%. In some embodiments, the difference in temperature between separated liquid 1B at liquid outlet 39B and mixture 2 at receiving inlet 32 is 50%. In some embodiments, the temperature difference is at least 40%. In some embodiments, the temperature difference is at least 30%. In some embodiments, the temperature difference is at least 20%.

In the embodiments described above, the liquid comprises lubricant (e.g. lubricant for a liquid-injected gas compressor). In some embodiments, the lubricant comprises oil lubricant. In some embodiments, the oil lubricant comprises synthetic oil, such as polyalphaolefin oils, synthetic esters, phosphate esters, polyalkylene glycols, alkylated naphthalenes, silicate esters, and/or the like. In some embodiments, the oil lubricant comprises mineral oils. In some embodiments, the oil lubricant comprises biolubricants, such as oleic canola oil, castor oil, palm oil, sunflower seed oil, rapeseed oil, and/or the like.

As will be apparent to those skilled in the art in the light of the foregoing disclosure, many alterations and modifications are possible in the practice of this invention without departing from the spirit or scope thereof. For example:

- cooler/separator 30 may be physically separated from some or all secondary functions such as coalescing filter, liquid filter, minimum pressure control valve and/or the like;
- in some embodiments, cooler/separator 30 may additionally or alternatively comprise other types of heat dissipating features, such as, by way of non-limiting example, plate type coolers, tube-in-shell type cooler, combinations of these coolers and/or the like. In some embodiments, such heat-dissipating features can be added to cooler/separator 30 but need not be a part of cooler/separator 30;
- in some embodiments, header unit 34 is not necessary and mixture 2 may flow directly from compressor mechanism 1 into conduits 36 via a suitably configured inlet 32;
- plurality of conduits 36 may be oriented horizontally or at an angle relative to collector 38, including between 0° to 90°;
- in some embodiments, mixture enters cooler/separator 30 from one horizontal side and flows through horizontally-oriented conduits and into a collector located at an opposite horizontal side; or
- the components of cooler/separator 30 may be oriented such that mixture 2 flows up conduits 36 against the force of gravity.

While a number of exemplary aspects and embodiments have been discussed above, those of skill in the art will recognize certain modifications, permutations, additions and sub-combinations thereof.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

While a number of exemplary aspects and embodiments have been discussed above, those of skill in the art will recognize certain modifications, permutations, additions and sub-combinations thereof.

It is therefore intended that the scope of the invention should not be limited by the embodiments set forth in the examples set out above, but should be given the broadest interpretation consistent with the description as a whole.

What is claimed is:

1. An apparatus for cooling a mixture of hot gas and liquid received from a liquid-injected gas compressor and simultaneously separating the gas from the liquid, the apparatus comprising:
   a receiving inlet in fluid communication with the compressor for receiving the mixture from the compressor;
   a plurality of eccentrically arranged conduits;
   a collector;
   wherein:
      each conduit is in fluid communication with the receiving inlet for receiving the mixture from the receiving inlet,
      each conduit is shaped to provide a separate flow path from the receiving inlet to the collector in a single flow direction, the single flow direction being generally common for the plurality of conduits, and
      each conduit comprising one or more heat-exchange surfaces for simultaneously separating the liquid from the gas and cooling both the liquid and the gas; and
   wherein the collector is connected to outlets of the conduits for receiving the separated gas and liquid from the conduits, the collector comprising:
   a gas outlet in fluid communication with the atmosphere for ejecting the gas from the collector into the atmosphere; and
   a liquid outlet, spaced apart from the gas outlet, for ejecting the liquid from the collector.

2. The apparatus of claim 1 wherein external surfaces of the conduits comprise heat-dissipating fins with fin surfaces that extend externally away from bores of the conduits.

3. The apparatus of claim 1 wherein the liquid comprises lubrication oil.

4. The apparatus of claim 1 comprising a fan operated to force air over external surfaces of the conduits to transfer heat away from the external surfaces and to thereby transfer heat away from the heat-exchange surfaces.

5. The apparatus of claim 1 wherein, in the collector, the gas outlet is located vertically above the liquid outlet.

6. The apparatus of claim 1 wherein the receiving inlet is located vertically above the conduits and the collector is located vertically below the conduits.

7. The apparatus of claim 1 wherein the liquid outlet is connected to the compressor by a connection that allows the liquid ejected from the liquid outlet to return to the compressor.

8. The apparatus of claim 1 comprising a filter connected to filter the separated liquid received from the conduits.

9. An apparatus according to claim 1 wherein the gas outlet is in indirect fluid communication with the atmosphere through a tool.

10. The apparatus of claim 1 wherein each conduit comprises a plurality of turbulators shaped to cause turbulence in a flow of the mixture therethrough and to provide turbulator heat-exchange surfaces, the turbulence and the turbulator heat-exchange surfaces simultaneously separating the liquid from the gas and cooling both the liquid and the gas.

11. The apparatus of claim 10 wherein, for each conduit, the plurality of turbulators comprise flow-facing turbulator surfaces which extend away from a sidewall of the conduit and into the bore of the conduit and which face a direction generally oriented to oppose the flow of the mixture through the conduit and wherein, for each turbulator surface, an angle between the turbulator surface and the sidewall of the conduit is at or greater than 90°.

12. The apparatus of claim 1 comprising a header unit in fluid communication with the receiving inlet and with the conduits for directing the mixture from the receiving inlet to the conduits, the header unit having a header cross-sectional flow area greater than that of the receiving inlet.

13. The apparatus of claim 12 wherein each conduit has a conduit cross-sectional flow area less than the header cross-sectional flow area and a combined conduit cross-sectional flow area of the conduits being larger than that of the receiving inlet.

14. The apparatus of claim 12 wherein the receiving inlet is located on one horizontal side of the conduits and the collector is located on an opposing horizontal side of the conduits.

15. A method of cooling a mixture of hot gas and liquid received from a liquid-injected gas compressor and simultaneously separating the gas from the liquid, the method comprising:
receiving the mixture from the compressor through a receiving inlet;
directing the mixture into a plurality of eccentrically arranged conduits, each conduit shaped to provide a separate flow path from the receiving inlet to a collector in a single flow direction, the single flow direction being generally common for the plurality of conduits, a combined cross-sectional flow area of the plurality of the conduits greater than that of the receiving inlet, thereby reducing the speed of the mixture;
in each of the plurality of conduits, simultaneously separating the liquid from the gas and cooling both the gas and the liquid; and
ejecting the cooled gas from the collector into the atmosphere through a gas outlet and ejecting liquid from the collector through a liquid outlet spaced apart from the gas outlet.

16. The method of claim 15 comprising receiving the separated gas and liquid in a collector, directing the gas out of the collector via a gas outlet in the collector and directing the liquid out of the collector via a liquid outlet in the collector.

17. The method of claim 15 wherein the liquid comprises lubrication oil.

18. The method of claim 15 wherein simultaneously separating the liquid from the gas and cooling both the gas and the liquid comprises providing the conduits with turbulators shaped to cause turbulence in a flow of the mixture therethrough and to provide turbulator heat-exchange surfaces.

19. The method of claim 15 comprising providing, on external surfaces of the conduits, heat-dissipating fins with fin surfaces that extend away from bores of the conduits.

20. The method of claim 15 comprising returning the liquid from the collector to the compressor.

21. The method of claim 15 comprising operating a fan to force air over external surfaces of the conduits to transfer heat away from the external surfaces and to thereby transfer heat away from the gas and the liquid as they flow through the conduits.

22. The method of claim 15 comprising, in the collector, locating the gas outlet vertically above the liquid outlet.

23. The method of claim 15 comprising providing, in each conduit, turbulators which comprise flow-facing turbulator surfaces that extend away from a sidewall of the conduit and into a bore of the conduit and that face a direction generally oriented to oppose the flow of the mixture through the conduit and wherein, for each turbulator surface, an angle between the turbulator surface and the sidewall of the conduit is greater than 90°.

24. The method of claim 15 comprising cooling the temperature of the separated gas at the gas outlet to at least 20% less than the temperature of the mixture at the receiving inlet.

25. The method of claim 15 comprising cooling the temperature of the separated liquid at the liquid outlet to at least 20% less than the temperature of the mixture at the receiving inlet.

26. A method according to claim 15 wherein ejecting the cooled gas into the atmosphere comprises indirectly ejecting the cooled gas into the atmosphere through a tool.

27. The method of claim 15 comprising directing the mixture from the receiving inlet into a header unit having a cross-sectional flow area greater than that of the receiving inlet and from the header unit into the plurality of conduits.

28. The method of claim 27 comprising locating the header unit vertically above the conduits and locating the collector vertically below the conduits.

29. The method of claim 27 comprising locating the header unit horizontally on one side of the conduits and locating the collector horizontally on an opposing side of the conduits.

* * * * *